(12) United States Patent
Shapira et al.

(10) Patent No.: US 10,270,566 B2
(45) Date of Patent: Apr. 23, 2019

(54) MIMO SOUNDING OVER PARTIAL SUBGROUPS OF TRANSMIT ANTENNAS

(71) Applicant: Celeno Communications (Israel) Ltd., Raanana (IL)

(72) Inventors: Nir Shapira, Raanana (IL); Gregory Lerner, Petach-Tikva (IL)

(73) Assignee: Celeno Communications (Israel) Ltd., Raanana (IL)

( * ) Notice: Subject to any disclaimer, the term of this patent is extended or adjusted under 35 U.S.C. 154(b) by 110 days.

(21) Appl. No.: 15/194,588

(22) Filed: Jun. 28, 2016

(65) Prior Publication Data

US 2017/0005760 A1    Jan. 5, 2017

Related U.S. Application Data

(60) Provisional application No. 62/187,280, filed on Jul. 1, 2015.

(51) Int. Cl.
*H04L 5/00* (2006.01)
*H04B 7/0417* (2017.01)
*H04L 27/26* (2006.01)

(52) U.S. Cl.
CPC ........... *H04L 5/001* (2013.01); *H04B 7/0421* (2013.01); *H04L 5/0048* (2013.01); *H04L 27/2601* (2013.01); *H04L 5/0023* (2013.01)

(58) Field of Classification Search
CPC ....... H04L 5/001; H04L 27/26; H04L 5/0048; H04B 7/0421
See application file for complete search history.

(56) References Cited

U.S. PATENT DOCUMENTS

2008/0095268 A1\* 4/2008 Aldana ................ H04B 7/0691
375/299
2015/0318878 A1\* 11/2015 Damodaran ............ H04B 7/04
375/296

FOREIGN PATENT DOCUMENTS

WO    2011159800 A1    12/2011

OTHER PUBLICATIONS

IEEE Standard for Information technology 802.11ac™— "Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz", 425 pages, Dec. 2013.
International Application # PCT/IB2016/053840 Search Report dated Sep. 27, 2016.

\* cited by examiner

*Primary Examiner* — Vinncelas Louis
(74) *Attorney, Agent, or Firm* — Kligler & Associates

(57) ABSTRACT

A wireless access point (AP) includes multiple transmit antennas and circuitry. The circuitry is configured to transmit multiple sounding frames to a receiver that includes one or more receive antennas, the sounding frames are transmitted via respective different partial subgroups of the transmit antennas, to receive from the receiver feedback information that specifies for each of the sounding frames a respective channel between the transmit antennas in the respective partial subgroup and the receive antennas, and, to determine a steering matrix based on the feedback information, and transmit to at least the receiver via at least some of the transmit antennas using the steering matrix.

16 Claims, 4 Drawing Sheets

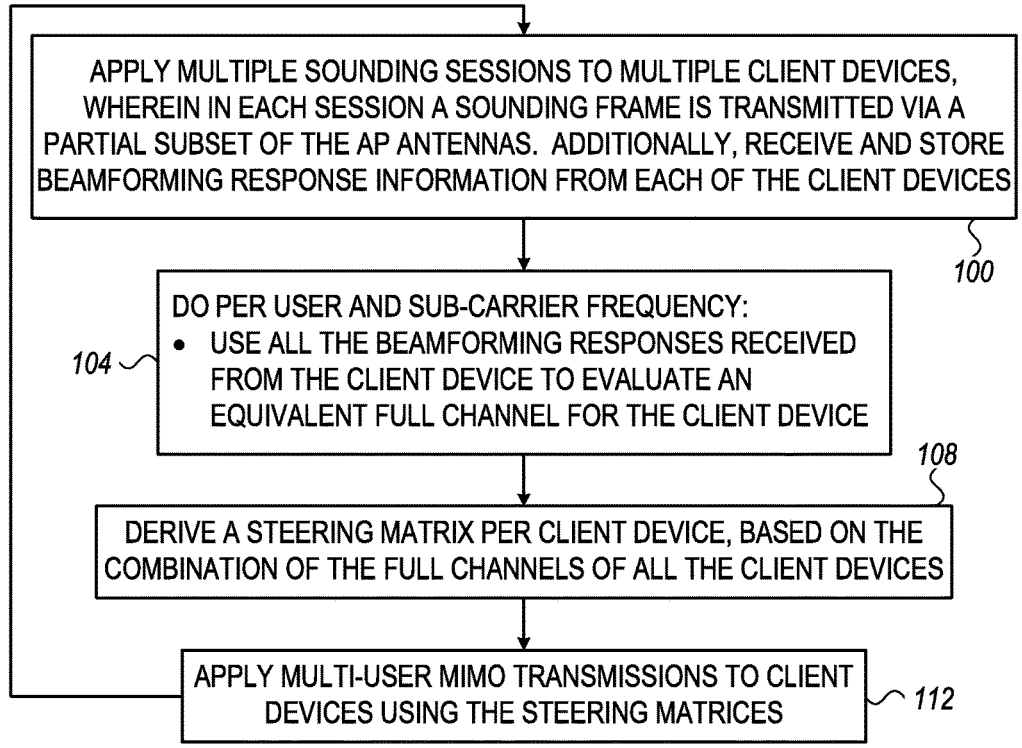
FIG. 2
FIG. 3
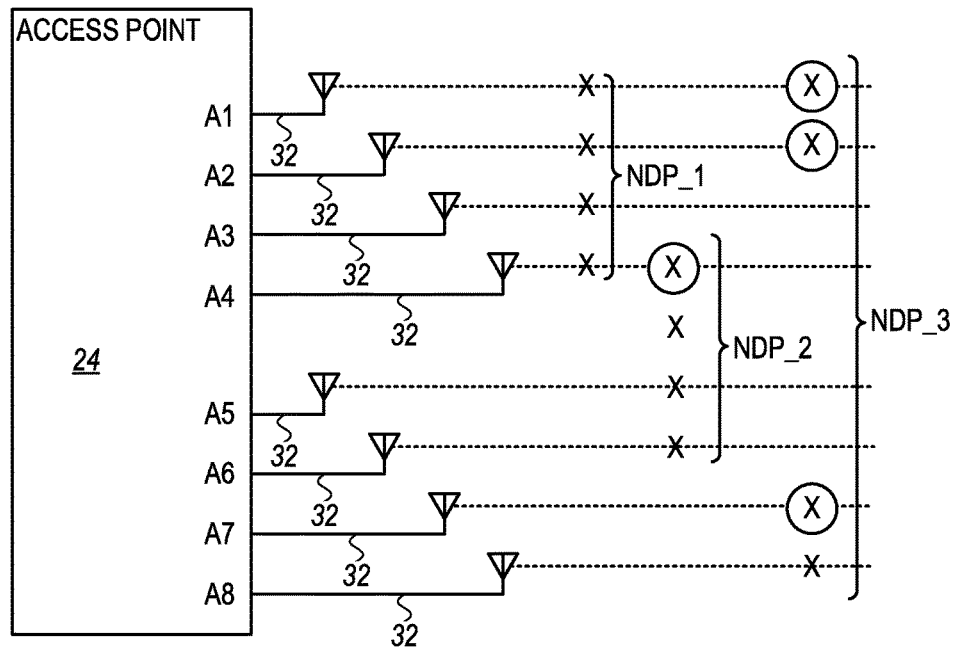

MIMO SOUNDING OVER PARTIAL SUBGROUPS OF TRANSMIT ANTENNAS

CROSS-REFERENCE TO RELATED APPLICATIONS

This application claims the benefit of U.S. Provisional Patent Application 62/187,280, filed Jul. 1, 2015, whose disclosure is incorporated herein by reference.

TECHNICAL FIELD

Embodiments described herein relate generally to communication systems, and particularly to methods and systems for channel calibration in MIMO communications.

BACKGROUND

In wireless communications, the term "multiple-input multiple-output," or MIMO, refers to methods in which the communicating parties use multiple antennas to better exploit the radio channel. MIMO systems that support communicating with multiple users simultaneously are referred to as multi-user (MU)-MIMO systems.

IEEE standard, "IEEE Std 802.11ac™-2013," December 2013, whose disclosure is incorporated herein by reference, is a wireless networking standard in the 802.11 family, also known as "Wi-Fi", which can be used in implementing high-throughput MU-MIMO wireless local area networks (WLANs) on the 5 GHz band.

In some types of MIMO systems, transmissions via multiple antennas are shaped spatially, or precoded, using beamforming techniques, which are typically based on knowledge of the channel between the transmitter and receiver. In some MIMO systems, the transmitter and receiver jointly measure the communication channel using a channel calibration process. The IEEE 802.11ac standard cited above specifies, e.g., in section 9.31, a calibration process of this sort, also referred to as "channel sounding."

SUMMARY

An embodiment that is described herein provides a wireless access point (AP) that includes multiple transmit antennas and circuitry. The circuitry is configured to transmit multiple sounding frames to a receiver that includes one or more receive antennas, the sounding frames are transmitted via respective different partial subgroups of the transmit antennas, to receive from the receiver feedback information that specifies for each of the sounding frames a respective channel between the transmit antennas in the respective partial subgroup and the receive antennas, and, to determine a steering matrix based on the feedback information, and transmit to at least the receiver via at least some of the transmit antennas using the steering matrix.

In some embodiments, the circuitry is configured to modulate transmissions to the receiver using an orthogonal frequency-division multiplexing (OFDM) scheme having multiple sub-carrier frequencies, and to determine a respective steering matrix for each OFDM sub-carrier frequency. In other embodiments, the circuitry is configured to receive, in response to the sounding frames, second feedback information from another receiver, and to determine the steering matrix based on both the feedback information and the second feedback information. In yet other embodiments, the circuitry is configured to transmit first and second sounding frames via respective first and second partial subgroups of the transmit antennas that have a shared transmit antenna, to receive respective first and second channels corresponding to the respective subgroups of the transmit antennas, and to align a phase of the second channel based on the phase measured in an element of the first channel corresponding to the shared transmit antenna.

In an embodiment, the circuitry is configured to transmit a given sounding frame using a temporary steering matrix that depends on the feedback information received in response to transmitting one or more previous sounding frames. In another embodiment, the circuitry is configured to determine the temporary steering matrix based on one or more strongest sub-channels of the channels reported in response to the previous sounding frames. In yet other embodiments, the circuitry is configured to transmit the given sounding frame using a beam-formed transmission in which at least two transmit antennas are assigned different steering weights.

In some embodiments, the circuitry is configured to determine the steering matrix by generating, based on the feedback information, multiple null subspaces corresponding to sub-channels reported in response to the respective sounding frames, and to combine the multiple null subspace to produce a full null space. In other embodiments, the circuitry is configured to determine the steering matrix by producing a basis that spans a full space that is complementary to the full null space.

There is additionally provided, in accordance with an embodiment that is described herein, a method including, in a wireless access point (AP) that includes multiple transmit antennas, transmitting multiple sounding frames to a receiver that includes one or more receive antennas. The sounding frames are transmitted via respective different partial subgroups of the transmit antennas. Feedback information that specifies for each of the sounding frames a respective channel between the transmit antennas in the respective partial subgroup and the receive antennas is received from the receiver. A steering matrix is determined based on the feedback information, and transmitting to at least the receiver is carried out via at least some of the transmit antennas using the steering matrix.

These and other embodiments will be more fully understood from the following detailed description of the embodiments thereof, taken together with the drawings in which:

BRIEF DESCRIPTION OF THE DRAWINGS

FIG. 2 is a flow chart that schematically illustrates a method for channel sounding in a MU-MIMO communication system, in accordance with an embodiment that is described herein;

FIG. 3 is a diagram that schematically illustrates an example multi-sounding channel calibration process for a single-antenna receiver, in accordance with an embodiment that is described herein;

DETAILED DESCRIPTION OF EMBODIMENTS

Overview

Figure 1:
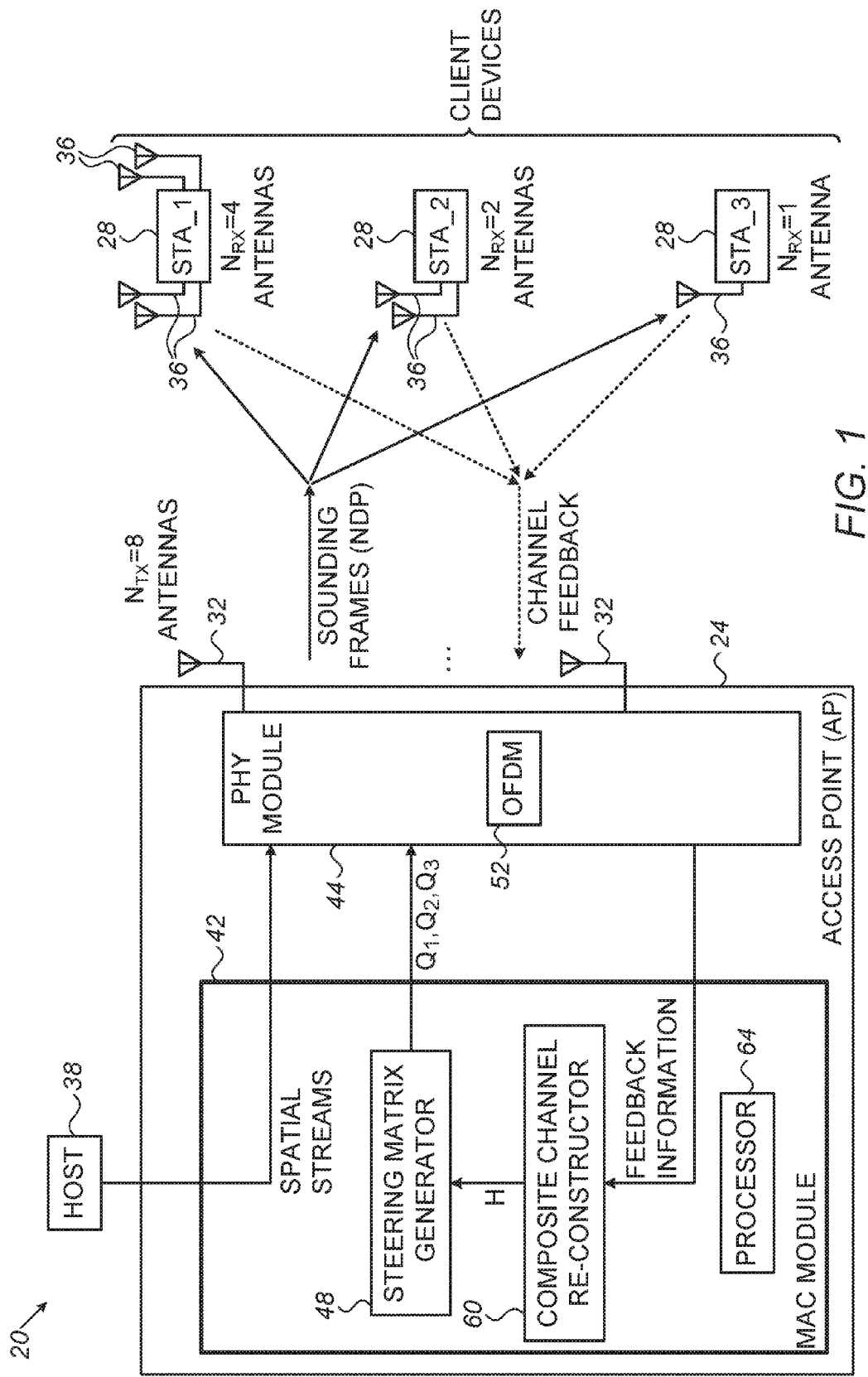
FIG. 1 is a block diagram that schematically illustrates a multi-user (MU) multiple-input multiple-output (MIMO) communication system, in accordance with an embodiment that is described herein.

In MU-MIMO communications, a transmitter transmits to multiple users at the same time and using the same frequency by separating its transmissions spatially using beamforming techniques, thus increasing the network data throughput. In the description that follows we refer mainly to MU-MIMO systems, in which a single access point (AP) communicates with multiple client devices.

Consider an AP having $N_{TX}$ transmit antennas, which communicates with a client device having $N_{RX}$ receive antennas. The AP may transmit to the client device up to $N_{SS}$ spatial streams simultaneously, wherein $N_{SS}$ does not exceed $N_{RX}$ so that the client device is able to separate among the spatial streams. A steering matrix Q at the AP transmitter assigns weights to be applied to each spatial stream over each of the transmit antennas to beamform the transmissions as desired.

Determining the steering matrix Q for a given client device typically requires knowledge of the characteristics of the communication channel between all possible pairs of transmitter and receiver antennas, also referred to herein as a "full channel." The channel between a single transmit antenna and a single receive antenna is also referred to herein as a "sub-channel" and a channel between a partial subgroup of the transmit antennas and all the receive antennas is referred to herein as a "partial channel." In some MIMO systems, to estimate the full channel the transmitter and receiver jointly perform a channel calibration procedure, also referred to as channel sounding.

In the context of the present disclosure and in the claims the term "channel" refers to the effect of the underlying communication channel on the transmitted signal. Mathematically, the sub-channel between a given pair of transmit-receive antennas is typically represented by a complex number that gives the gain and phase shift applied by the sub-channel to the signal.

In principle, the AP could perform sounding by transmitting to the receiver a sounding frame that contains known training data via all the transmit antennas with unity weights. The receiver would estimate the full channel using the training data, and would send to the AP feedback information that identifies all the sub-channels between the $N_{TX}$ transmit antennas and the client device's $N_{RX}$ receive antennas.

Sounding via the entire array of transmit antennas, however, is not always possible or desired. For example, in some practical situations, the receiver supports estimating the sub-channels for only a limited number of transmit antennas due to various reasons such as, for example, limited computational capabilities or legacy technology. An AP that has a large number of transmit antennas, e.g., for improved beamforming performance, for serving a large number of client devices or for sending a large number of spatial streams, would be unable to perform full channel calibration with a receiver that supports channel sounding with less than the entire AP transmit antennas.

Embodiments that are described herein provide methods and systems for channel calibration for an AP having $N_{TX}$ transmit antennas. In the disclosed embodiments, the AP performs multiple sounding sessions with a given client device, and combines the feedback information reported by the client device in response to the sounding sessions for estimating the full channel. In the disclosed techniques, the AP transmits to the receiver multiple sounding frames, via different partial subgroups of the transmit antennas, e.g., in accordance with the receiver capabilities. The AP receives from the receiver feedback information that specifies for each of the sounding frames a partial channel between the transmit antennas in the respective partial subgroup and the receive antennas. The AP determines, based on the feedback information, a steering matrix to be used for spatially shaping transmissions destined to the receiver via some or all of the transmit antennas.

In some embodiments, the AP modulates the spatial streams for transmission using an orthogonal frequency-division multiplexing (OFDM) modulation scheme having multiple sub-carrier frequencies. In such embodiments, the AP receives separate feedback information for one or more of the sub-carrier frequencies, and determines a respective dedicated steering matrix per sub-carrier frequency.

In some embodiments, the AP performs channel sounding for multiple client devices in parallel. The AP transmits the sounding frames as described above, and based on feedback information received from each client device determines respective equivalent full channel for the client devices. Using these individual full channels, the AP produces a composite channel from which the AP derives an individual steering matrix per client device. In deriving the steering matrix for a given client device the AP takes into consideration the full channels estimated for the other client devices.

In some embodiments, the receiver estimates and reports to the AP an equivalent version of the partial channel in which the sub-channels are independent from one another. In the description that follows, such a partial channel is also referred to as an equivalent partial channel. In addition, full and composite channels that are derived from such equivalent partial channels are also referred to as equivalent full channels and equivalent composite channels, respectively.

In some embodiments, when performing channel sounding vis-à-vis a given receiver, each of the partial antenna-subgroups shares at least one antenna with another partial subgroup. Since the partial channels reported in response to different sounding frames are not guaranteed to be phase aligned, the AP aligns the phases in one partial channel based on the phase measured in an element of the other channel corresponding to the shared antenna to derive the full channel.

In some embodiments, the AP first performs multiple independent sounding sessions and uses the respective partial channels reported to initialize a full dimensions temporary steering matrix. The AP then iteratively performs sounding using the temporary steering matrix and uses the feedback information received in response to update the temporary steering matrix. Updating the temporary steering matrix is based on selecting the strongest sub-channels among previously reported partial channels.

In some embodiments, the AP determines the steering matrix by generating, based on the feedback information, multiple null subspace eigenvectors corresponding to partial channels reported in response to the respective sounding frames. The AP then combines the multiple null subspace eigenvectors to produce a full null space for the client device. The AP recovers the full channel for the client device by producing a basis that spans a full space, which is the complementary to the full null space.

In the disclosed techniques, channel calibration for a given client device is carried out by transmitting multiple sounding frames and combining feedback information sent by the client device in response. The sounding frames are transmitted via different partial subgroups of the transmit antennas. Using the disclosed techniques, an AP can perform full channel calibration with client devices that support sounding only with a number of transmit antennas smaller than the number of AP transmit antennas. In addition, sounding using a smaller number of antennas simplifies matrix calculations involved in estimating the channel between the transmitter and receiver.

System Description

FIG. 1 is a block diagram that schematically illustrates a multi-user (MU) multiple-input multiple-output (MIMO) communication system 20, in accordance with an embodiment that is described herein. System 20 comprises an access point (AP) 24, which in the present example communicates with three client devices 28, which are also referred to as users, or stations, and are denoted STA_1, STA_2 and STA_3 in the figure.

System 20 may comprise, for example, a Wi-Fi communication system that operates in accordance with the IEEE 802.11ac standard cited above. Alternatively, system 20 may comprise any other suitable MU-MIMO system, such as, for example, systems that are based on space-division multiple access (SDMA) technologies. In the description that follows we refer mainly to a MU-MIMO system, in which a single base, e.g., AP 24, communicates with multiple client devices simultaneously.

AP 24 comprises multiple AP antennas 32, and each of client devices 28 comprises one or more STA antennas 36. In the downlink direction, AP antennas 32 function as transmit antennas and STA antennas 36 function as receive antennas. In the present example, AP 24 comprises $N_{TX}=8$ transmit antennas, and client devices STA_1, STA_2 and STA_3 comprise $N_{RX}=4$, $N_{RX}=2$ and $N_{RX}=1$ receive antennas, respectively.

AP 24 transmits one or more spatial streams to each of client devices 28 via transmit antennas 32. The spatial streams may be provided by an external host computer 38, or generated internally within AP 24. AP 24 comprises a medium access control (MAC) module 42 and a physical-layer (PHY) module 44. The MAC module comprises a steering matrix generator 48, a composite channel re-constructor 60 and a processor 64.

Processor 64 carries out various tasks of the MAC module such as controlling and scheduling the transmissions via the PHY module. In the downlink direction the PHY module processes the spatial streams for transmission via transmit antennas 32. In the example of system 20, the PHY module applies beamforming to the spatial streams, and modulates the spatial streams using an orthogonal frequency-division multiplexing (OFDM) modem 52. The PHY module maps bits in the spatial streams to symbols, e.g., in accordance with a Quadrature-Amplitude Modulation (QAM) scheme, and further maps the symbols to multiple sub-carriers in the frequency domain.

In the uplink direction, the PHY module receives transmissions from the client devices and demodulates these transmissions to extract information sent from the client devices to the AP, such as sounding feedback information.

Steering matrix generator 48 generates steering matrices, which the PHY module uses for applying beamforming to the spatial streams. A steering matrix denoted Q defines $N_{TX} \cdot N_{SS}$ (typically complexed valued) weights to be applied to the $N_{SS}$ spatial streams. Each element of Q specifies the beamforming weight applied to the signal of a particular spatial stream when transmitted via a particular transmit antenna. In OFDM based systems such as system 20, generator 48 provides for each client device and for each of the OFDM sub-carriers a dedicated respective steering matrix.

Let $S_i$ denote a group of $N_{SS}^i$ symbols corresponding to respective $N_{SS}^i$ spatial streams to be transmitted using a given OFDM sub-carrier to the $i^{th}$ client device among $N_u$ client devices. For the given OFDM sub-carrier, the steered signal $TX_i$ toward the $i^{th}$ client device is given by:

$$TX_i = Q_i \cdot S_i \quad \text{Equation 1:}$$

wherein $TX_i$ is a $N_{TX}$-by-1 vector, $Q_i$ is a $N_{TX}$-by-$N_{SS}^i$ steering matrix, and $S_i$ is a $N_{SS}^i$-by-1 vector. The signal $TX_{AP}$ transmitted to all the client devices simultaneously is a superposition of the individual transmissions as follows:

$$TX_{AP} = \sum_i TX_i = \sum_{i=1}^{N_u} Q_i \cdot S_i \quad \text{Equation 2}$$

In some embodiments, to determine the steering matrices, the AP performs a channel calibration procedure, also referred to as a channel sounding procedure, or simply sounding, for brevity. During a sounding session, the AP transmits a sounding frame that contains known training data, which the receiver uses for estimating the channel between the transmitter and receiver antennas.

In the disclosed embodiments, the sounding frame is transmitted via a partial subgroup of the transmit antennas 32, and therefore the receiver is able to estimate only a partial channel of the complete or full channel.

Assuming that the AP transmits the sounding frame via $N_{ts} < N_{TX}$ transmit antennas, the client device estimates the partial channel between the transmit antennas in the respective subgroup of transmit antennas and its $N_{RX}$ receive antennas 36, and sends in response feedback information that specifies the partial channel, back to the AP.

In system 20, we assume that the client device estimates for the partial channel $H_p$ an equivalent partial channel, which separates the $N_{SS}$ spatial streams over $N_{SS}$ respective sub-channels. In the present example, the client device decomposes $H_p$ using a singular value decomposition (SVD) as follows:

$$H_p = U_p \cdot S_p \cdot V_p^H \quad \text{Equation 3:}$$

wherein the operator $(.)^H$ denotes the complex transpose operator. In Equation 3, $H_p$ is $N_{RX}$-by-$N_{ts}$, $U_p$ is $N_{RX}$-by-$N_{RX}$, $S_p$ is a $N_{RX}$-by-$N_{SS}$ diagonal matrix, and $V_p$ is $N_{ts}$-by-$N_{SS}$. The matrix $V_p$ represents the optimal steering matrix for a given client device while ignoring the effect that transmitting using this steering matrix may have on the other client devices.

In Equation 3, the matrix $S_p$ is a diagonal matrix that specifies signal to noise (SNR) deviations per spatial stream for that client device. The elements on the diagonal of matrix $S_p$ are also referred to as "eigenvalues" and the columns of $V_p$ are also referred to as "eigen-modes," "eigenvectors" or "steering vectors." The client device reports to the AP a matrix-pair (S,V) per OFDM sub-carrier, wherein S and V comprise the first $N_C$ columns of Sp and Vp, respectively. Note that by using SVD, the first $N_C$ columns of $V_p$ correspond to the largest or strongest eigenvalues of $S_p$. The steering vectors corresponding to the largest eigenvalues are also referred to as the "strongest sub-channels."

$$S = S_p[\text{columns}(1 \ldots N_C)]$$

$$V = V_p[\text{columns}(1 \ldots N_C)] \quad \text{Equation 4:}$$

Composite channel re-constructor 60 of the MAC module combines the equivalent full channels $H_i$ from all the client devices to determine an equivalent composite channel matrix H as follows:

$$H = \begin{bmatrix} H_1 \\ \vdots \\ H_{N_u} \end{bmatrix} \quad \text{Equation 5}$$

In Equation 5 $H_i$ denotes the equivalent full channel matrix of the $i^{th}$ client device, which is given by:

$$H_i = S_i \cdot V_i^H \quad \text{Equation 6:}$$

wherein $S_i$ and $V_i$ are derived from the equivalent partial channel matrices S and V (defined in Equation 4 above) received over multiple sounding frames. In Equation 6, the full channel $H_i$ is $N_{TX}$-by-$N_{RX}$, $S_i$ is $N_{RX}$-by-$N_C$, and $V_i$ is $N_{TX}$-by-$N_C$. Several methods for deriving $H_i$ by applying multiple sounding sessions via partial subgroups of the transmit antennas are described in detail below.

Using the composite channel matrix H, the generator 48 calculates individual steering matrices $Q_i$ for the respective client devices. Generator 48 may use any suitable method for calculating the steering matrices of the client devices. For example, in some embodiments, generator 48 determines the steering matrix for a given client device so that the transmissions intended to this client device create a transmission null in the directions of the other client devices.

The configurations of system 20 and AP 24 depicted FIG. 1 are exemplary configurations, which are shown purely for the sake of conceptual clarity. Any other suitable system and/or AP configuration can be used. Elements that are not necessary for understanding the principles of the present invention, such as various interfaces, addressing circuits, timing and sequencing circuits and debugging circuits, have been omitted from the figure for clarity.

For example, although in the example of FIG. 1 AP 24 communicates with three client devices, in practical implementation AP 24 may communicate with any other suitable number of client devices. In the exemplary system configuration shown in FIG. 1, MAC module 42 and PHY module 44 are implemented as separate Integrated Circuits (ICs). In alternative embodiments, however, the MAC module, PHY module and one or more other elements of the MAC module such as steering matrix generator 48 and composite channel re-constructor 60 may be integrated on separate semiconductor dies in a single Multi-Chip Package (MCP) or System on Chip (SoC), and may be interconnected by an internal bus. Further alternatively, some or all of the functionality of AP 24 can be implemented in software and carried out by a processor or other element of host 38. In some embodiments, host 38 and AP 24 may be fabricated on the same die, or on separate dies in the same device package.

In some embodiments, elements of MAC module 42, for example processor 64, generator 48 and/or composite channel re-constructor 60, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the context of the present disclosure and in the claims, all the AP elements excluding AP antennas 32 are collectively referred to as "circuitry." In FIG. 1, the circuitry comprises MAC module 42 including processor 64, generator 48 and composite channel re-constructor 60, and PHY module 44.

Sounding Via Partial Subgroups of Transmit Antennas

FIG. 2 is a flow chart that schematically illustrates a method for channel sounding in a MU-MIMO communication system, in accordance with an embodiment that is described herein. The method is described as executed by AP 24 of FIG. 1.

The method begins with processor 64 performing multiple sounding sessions, at a multi-sounding step 100. In each of these sounding sessions, the PHY module transmits a sounding frame (e.g., an NDP) via a respective partial subgroup of AP antennas 32. In some embodiments, the partial subgroups together cover the entire AP antennas. For example, for $N_{TX}=8$ the PHY module may transmit one sounding frame via the AP antennas {1,2,3,4} and another sounding frame via AP antennas {5,6,7,8}.

Further at step 100, the composite channel re-constructor receives via the PHY module, from each client device, feedback information that the client device generates in response to receiving the sounding frames. The feedback information corresponding to a given sounding frame provides estimation of the partial channel between the AP antennas used for sending the sounding frame and the receive antennas of the client device. In some embodiments the feedback information comprises a matrix-pair (S,V) as given, for example, in Equation 4 above. In some embodiments, the composite channel re-constructor collects and stores the beamforming responses from all the client devices.

At a feedback information processing step 104, based on the feedback information responses received for each client device, the composite channel re-constructor calculates for each client device an equivalent full channel matrix $H_i$. As will be described below, in some embodiments, the composite channel re-constructor combines the re-constructed equivalent full channels to derive an equivalent composite channel H, which generator 48 uses to determine one or more steering matrices, which the processor uses to perform respective one or more additional beam-formed sounding iterations. In the context of the present disclosure and in the claims, the term "beam-formed transmission" refers to a transmission in which at least two of the transmit antennas are assigned different respective steering weights.

At a calibration step 108, the composite channel re-constructor first combines the full channel matrices $H_i$ to produce a composite channel matrix H, as given, for example, in Equation 5 above. The steering matrix generator uses the matrix H to derive a steering matrix Qi for each of the client devices. In some embodiments, the AP determines the steering matrix for a given client device so as to create transmission nulls in the directions of the other client devices.

At a MU-MIMO transmission step 112, the AP transmits data, via the PHY module, to multiple client devices simultaneously, while shaping the transmissions using the calibrated steering matrices $Q_i$ of step 108. The method then loops back to step 100 to initiate a subsequent channel calibration procedure.

Multi-Sounding for a Receiver Having a Single Antenna

FIG. 3 is a diagram that schematically illustrates a multi-sounding channel calibration process for a single-antenna receiver, in accordance with an embodiment that is described herein. We assume that the AP in FIG. 3 operates in a MU-MIMO system such as system 20 of FIG. 1, and that its functionality is similar to the functionality of AP 24.

In the present example, the AP comprises $N_{TX}=8$ transmit antennas 32. In addition, the client device comprises a single receive antenna, i.e., $N_{RX}=1$, and therefore the AP can send to this client device a single spatial stream using a 8-by-1 steering vector denoted V. We additionally assume that the client device in question supports generating feedback information for sounding frames transmitted (with unity weights) via $N_{ts}=4$ or less transmit antennas.

Note that since each sounding frame is transmitted with an arbitrary phase, each antenna-subgroup should share at least one antenna with another antenna-subgroup so that the feedback information corresponding to the respective sounding frames can be phase and gain aligned, as will be described below.

In the embodiment of FIG. 3, processor 64 of AP 24 schedules the transmission of three sounding frames via respective partial four-antenna subgroups of the total eight antennas. In the present example, the sounding frames are denoted NDP1 NDP2 and NDP3, and transmitted via antenna-subgroups {A1,A2,A3,A4}, {A4, A5, A6, A7} and {A1, A2, A7, A8}, respectively. As seen in the figure, antenna A4 is shared between the subgroups used for transmitting NDP1 and NDP2. In addition, antennas A1 and A2 are shared with the subgroups used for transmitting NDP1 and NDP3, and antenna A6 is shared between the subgroups used for transmitting NDP1 and NDP2.

The steering matrix for transmitting each sounding frame can be defined as a 8-by-4 matrix, in which '1' entries correspond to the transmitted spatial stream and respective transmit antenna. For example, the steering matrices for transmitting NDP1, NDP2 and NDP3 in this example are given by:

$$Q_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix}, Q_2 = \begin{bmatrix} 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \end{bmatrix},$$

$$Q_3 = \begin{bmatrix} 1 & 0 & 0 & 0 \\ 0 & 1 & 0 & 0 \\ 0 & 0 & 0 & 0 \\ 0 & 0 & 0 & 0 \\ 0 & 0 & 0 & 0 \\ 0 & 0 & 0 & 0 \\ 0 & 0 & 1 & 0 \\ 0 & 0 & 0 & 1 \end{bmatrix},$$

Equation 7

For a given client device, let k=1,2,3 denote the index of the $k^{th}$ sounding frame and let $VF_k$ denote the 4-by-1 steering vector reported in the feedback information corresponding to this sounding frame. The receiver may derive $VF_k$, for example, using Equation 4 above, for a case in which $V_p$ has a single column. The respective full dimension 8-by-1 steering vector $V_k$ is given by:

$$V_k = Q_k \cdot VF_k, \; k=1,2,3 \qquad \text{Equation 8:}$$

In some embodiments, the MAC module of AP 24 uses the shared antennas, to adjust the phase and gain between $V_1$, $V_2$ and $V_3$ of Equation 8 to derive the 8-by-1 steering vector V. In an embodiment, the MAC module performs this adjustment sequentially as described herein. The MAC module first initializes V to $V_1$.

$$V(n)=V_1(n), \; n=1,2,3,4 \qquad \text{Equation 9:}$$

wherein V(n) denotes the steering weight applied to antenna An. Since antenna A3 is shared between NDP2 and NDP1, the MAC module adjusts $V_2$ by multiplying the elements corresponding to antennas A5, A6 and A7 by the complex valued factor $V_1(A3)/V_2(A3)$:

$$V(n) = V_2(n) \cdot \frac{V_1(3)}{V_2(3)}, \; n = 5, 6, 7 \qquad \text{Equation 10}$$

In a similar manner, $V_3$ is adjusted based on shared antenna A6:

$$V(n) = V_3(n) \cdot \frac{V_2(6)}{V_3(6)}, \; n = 8 \qquad \text{Equation 11}$$

Alternatively, the MAC module can adjust $V_3$ using one of the shared antenna A1 or A2, i.e., multiplying by a factor $V_1(1)/V_3(1)$ or $V_1(2)/V_3(2)$, respectively.

In the embodiment described above, processor 64 schedules the transmissions of NDP1, NDP2 and NDP3 in sequence, and as receiving a respective sounding report the MAC module updates V based on an antenna shared with the antenna-subgroup used in a previous sounding session. In alternative embodiments, the MAC module first collects the entire feedback information from all (or some) of the sounding sessions and calculates $V_1$, $V_2$ and $V_3$ using Equation 8. The MAC module can then derive V at a desired order. In an example embodiment, the MAC module initializes $V=V_2$, and then uses the factor $V_2(A3)/V_1(A3)$ to adjust $V_1$ and $V_2(A6)/V_3(A6)$ to adjust $V_3$.

Although in the method of FIG. 3, only one shared antenna uses for phase/gain adjustment, this is not mandatory. In alternative embodiments, when multiple antennas are shared between two sounding frames, the phase and gain can be adjusted based on multiple shared antennas.

Channel Calibration Using Iterative Sounding

Figure 4:
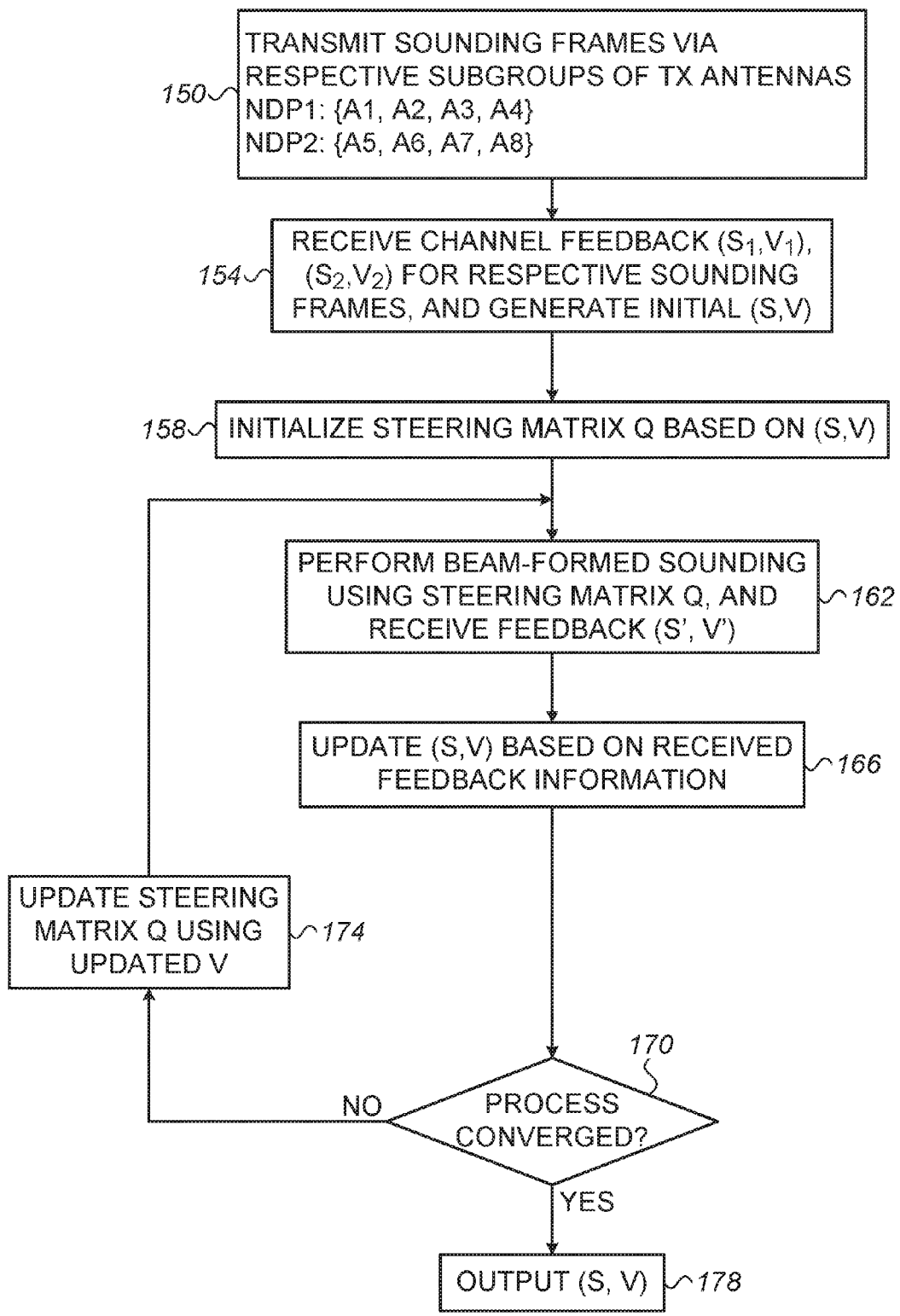
FIG. 4 is a flow chart that schematically illustrates an iterative channel sounding process, in accordance with an embodiment that is described herein.

FIG. 4 is a flow chart that schematically illustrates an iterative channel sounding process, in accordance with an embodiment that is described herein. In the present example, AP 24 comprises $N_{TX}=8$ transmit antennas and the receiver (e.g., client device 28) comprises $N_{RX}=2$ receive antennas. We further assume that up to $N_{ts}=4$ transmit antennas are allowed for sounding, and that the receiver reports $N_C=2$ columns of S and V (as given in Equation 4) in the feedback information.

In the disclosed method, the AP first performs independent sounding sessions via partial subgroups of the transmit antennas. The partial subgroups jointly cover the entire transmit antennas of the AP. The AP uses the partial channels reported by the independent sounding sessions to derive a 8-by-2 steering matrix Q and performs one or more beamformed sounding iterations in which the AP updates Q based on feedback information received.

The method begins with processor 64 schedules transmitting multiple sounding frames via respective antenna-subgroup, at a multi-sounding step 150. The partial antenna-subgroups jointly cover the entire $N_{TX}$ antennas. In the present example, the sounding frames NDP1 and NDP2 correspond to respective antenna-subgroups {A1 ... A4} and {A5 ... A8}. Steering matrix generator 48 sets steering matrices Q1 and Q2 used in transmitting NDP1 and NDP2 as:

$$Q_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix}, Q_2 = \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{bmatrix}$$ Equation 12

At a feedback reception step 154, composite channel re-constructor 60 receives from the client device, via the PHY module, feedback information corresponding to the sounding frames. In the present example, the feedback information includes the matrix pairs $(S_1, V_1)$ and $(S_2, V_2)$ corresponding to the respective sounding frames NDP1 and NDP2, wherein $V_1$, $V_2$ are $N_{ts}$-by-$N_C$ (4-by-2) matrices and $S_1$, $S_2$ are $N_{RX}$-by-$N_C$ (2-by-2) diagonal matrices, as given, for example, in Equation 4 above.

The composite channel re-constructor then combines the feedback matrices to derive matrices V and S as follows:

$$V = [Q_1 \cdot V_1 Q_2 \cdot V_2]$$ Equation 13:

$$S = \text{diag}[S_1 S_2]$$ Equation 14:

At a steering matrix initialization step 158, the MAC sorts the eigenvalues of the diagonal matrix S in a descending order, and rearranges the columns of the matrix V accordingly. The MAC then selects the first $N_{ts}=4$ columns of the reordered V to produce a $N_{TX}$-by-$N_{ts}$ (8-by-4) steering matrix Q. The described sorting results in a steering matrix Q whose columns are tuned to the strongest eigen-modes of V in Equation 13. Note that in the present example, since V comprises four columns, Q is initialized to the reordered version of V.

At a beam-formed sounding step 162 the processor schedules transmitting a sounding frame using steering matrix Q. This sounding generally involves transmitting the sounding frame via the entire array of $N_{TX}$ antennas. In response to the beam-formed sounding, the composite channel re-constructor receives via the PHY module feedback information (S',V') from the client device. Matrices S' and V' have dimensions $N_C$-by-$N_C$ and $N_{ts}$-by-$N_C$, respectively.

At an update step 166, the MAC updates S and V based on the feedback information. Specifically, the MAC applies the following sub steps:

Define temporary matrices $\tilde{V}=V$ and $\tilde{S}=S$.

Replaces the first $N_C$ columns of $\tilde{V}$ with the first $N_C$ columns of the matrix $[Q \cdot V']$.

Replace the first $N_C$ eigenvalues of $\tilde{S}$ with the first $N_C$ eigenvalues of S' and zero the next largest $N_{ts}-N_c=2$ eigenvalues of $\tilde{S}$.

Apply singular value decomposition (SVD) to get orthogonal steering vectors ordered in a descending order of the eigenvalues:

$$U \cdot S \cdot V^H == SVD(\tilde{S} \cdot \tilde{V}^H)$$ Equation 15:

Equation 15 provides the updated versions of the matrix-pair (S, V).

At a convergence check step 170, the processor checks whether the iterative sounding process has converged. In some embodiments, the processor terminates the iterative sounding when the number of nonzero eigenvalues in S is at most $N_{RX}$, in which case the first $N_C$ columns of V hold the updated steering matrix Q. Since at step 166, the number of nonzero eigenvalues reduces by $N_{ts}-N_C=2$, the termination condition is guaranteed to occur after one or more sounding iterations.

If at step 170 the iterative sounding has not yet converged, the steering matrix generator updates the steering matrix Q, at a steering matrix updating step 174, by setting Q equal to the first $N_{ts}=4$ columns of the updated matrix V, and the method loops back to step 162 in which the processor schedules transmitting a subsequent sounding frame using the updated steering matrix Q. Otherwise, the method proceeds to an output step 178 in which the MAC outputs the most updated versions of S and V, and the method then terminates.

In the example described above $N_{RX}=2$, and the convergence criterion is met after a single beam-formed iteration. Consider an alternative embodiment in which $N_{RX}=N_c=3$. In this case $N_{ts}-N_c=4-3=1$ and the method requires three beam-formed sounding iterations to converge, i.e., a total number of five sounding sessions. As another example, for the case $N_{RX}=N_C=4$, we get $N_{ts}-N_C=0$ in which case the iterative sounding process cannot be guaranteed to converge. The MAC may use the output S and V of step 178 to evaluate the equivalent full channel of the client device using $H_i=S \cdot V$ as given in Equation 6.

Sounding Using the Null Space

The $N_C$ columns of steering matrix $V_i$ of Equation 6 span a vector space that is referred to herein as a full space or an eigen-space denoted $V_{Eig}$. The full space has a complementary null space denoted $V_{Null}$ that is spanned by $N_{TX}-N_C$ vectors. The columns of $V_{Null}$ are also referred to herein as null-modes. These complementary spaces satisfy the relationships $V_{Eig}=\text{Null}(V_{Null})$ and $V_{Null}=\text{Null}(V_{Eigen})$, wherein the operator NULL(A) produces the null space of a space spanned by (the columns of) matrix A. Note that similar relationships hold for the eigen-subspace spanned by the matrix V reporting the partial channel as given in Equation 4 above. Since the null subspace of the partial channel is also a null space of $V_{Eig}$, it is possible to first produce $V_{Null}$ from multiple null subspaces derived by performing multiple respective sounding sessions, and then produce NULL $(V_{Null})$ to derive $V_{Eig}$.

Figure 5:
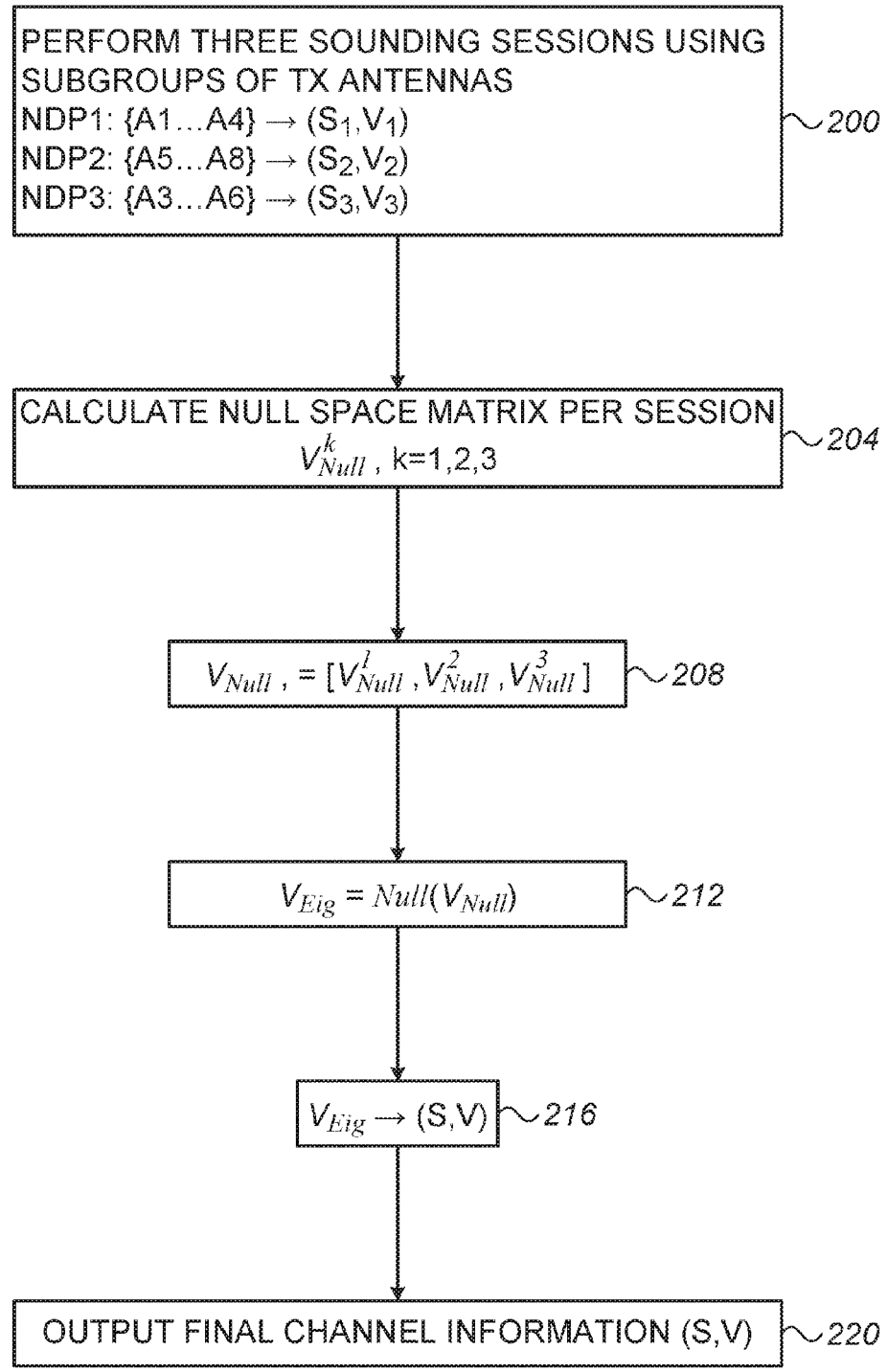
FIG. 5 is a flow chart that schematically illustrates an example channel sounding process via null space derivation, in accordance with an embodiment that is described herein.

FIG. 5 is a flow chart that schematically illustrates a channel sounding process via null space derivation, in accordance with an embodiment that is described herein.

The method begins with processor 64 schedules transmitting sounding frames NDP1, NDP2 and NDP3 via different respective antenna-subgroups {A1 ... A4}, {A5 ... A8} and {A3 ... A6}, at a multi-sounding step 200. The antenna-subgroups jointly cover the entire $N_{TX}=8$ antennas. The steering matrices involved in these sounding sessions are given as:

$$Q_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \\ 0 & 0 & 0 & 0 \\ 0 & 0 & 0 & 0 \end{bmatrix}, Q_2 = \begin{bmatrix} 0 & 0 & 0 & 0 \\ 0 & 0 & 0 & 0 \\ 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \end{bmatrix},$$

Equation 16

$$Q_3 = \begin{bmatrix} 0 & 0 & 0 & 0 \\ 0 & 0 & 0 & 0 \\ 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \end{bmatrix},$$

In response to receiving the sounding frames NDP1, NDP2 and NDP3, the client device sends back to the AP the respective partial channels $(S_1,V_1)$, $(S_2,V_2)$ and $(S_3,V_3)$, as given in Equations 4. In the present example $V_k$ is a $N_{ts}$-by-$N_C$ (4-by-2) matrix and $S_k$ is a $N_{RX}$-by-Nc (2-by-2) diagonal matrix. The equivalent partial channel matrix is given by $-S_k \cdot V_k^H$.

At a null space evaluation step 204, the MAC calculates a null subspace matrix $V_{null}^k$ for each of the sounding sessions as follows:

$$V_{null}^k = Q_k \cdot \text{Null}(V_k^H), k=1,2,3 \qquad \text{Equation 17:}$$

In Equation 17, $V_{null}^k$ is a $N_{TX}$-by-$(N_{TX}-N_{RX})$ matrix (8-by-2 in this example) whose vectors span a respective subspace of the full null space $V_{Null}$.

At a null space generation step 208, the MAC combines the subbases of step 204 to produce a (8-by-6 in this example) matrix $V_{Null}$ as:

$$V_{null} = [V_{null}^1 V_{null}^2 V_{null}^3] \qquad \text{Equation 18:}$$

At an eigen-space derivation step 212, the MAC calculates the null space of $V_{null}$, which results in the eigen-space:

$$V_{Eig} = \text{Null}(V_{null}) \qquad \text{Equation 19:}$$

The matrix $V_{Eig}$ in Equation 19 is a $N_{TX}$-by-$N_{RX}$ unitary matrix that spans the full space of the client device's eigen-modes. In other words, the actual eigenvectors of the channel between the $N_{TX}$ transmit antennas and the $N_{RX}$ receive antennas can be represented as linear combinations of the columns of the matrix $V_{Eig}$.

At a projection step 216, the MAC calculates the actual eigenvectors and eigenvalues by reverse projecting $V_k$ onto the subspace defined by $V_{Eig}$.

It can be shown that by reverse projecting one of the beamforming reports $(S_k, V_k)$ on $V_{Eig}$ and using SVD decomposition, the following expression holds:

$$U \cdot S \cdot V^H = SVD[S_k \cdot (V_{Eig}^H \cdot V_k)^{-1} \cdot V_{Eig}^H] \qquad \text{Equation 22:}$$

wherein S and V of Equation 22 hold the eigen-modes and eigenvalues of the client device's full channel $H_i$ as used, for example, in Equation 6 above. At an output step 220, the MAC outputs the S and V matrices of Equation 22, and the method then terminates. Typically, Equation 22 is evaluated for a single value of k. Alternatively, Equation 22 can be evaluated for multiple values of k to reduce noise.

In the method of FIG. 5, every sounding session via $N_{ts}$ out of $N_{TX}$ transmit antenna results in feedback information in which the client device reports $N_C$ eigen-modes. Therefore, the number of sounding sessions required is given by:

$$N_{Sounding} = \frac{N_{TX} - N_{RX}}{N_{ts} - N_{RX}} \qquad \text{Equation 23}$$

The embodiments described above are given by way of example, and other suitable embodiments can also be used. For example, although the example embodiments described above used certain partial subgroups of the AP antennas, in other embodiments, other suitable subgroups can also be used. For example, although in the above embodiments all the antenna-subgroups have the same number of antennas, in other suitable embodiments, different antenna-subgroups may comprise different numbers of the AP antennas.

Although the embodiments described herein mainly address sounding in MIMO Wi-Fi systems that are based on the IEEE 802.11ac standard, the methods and systems described herein can also be used in other applications, such as in other IEEE standards such as 802.11n, 802.11ad, 802.11ax and 802.11ah, as well as in other than Wi-Fi MIMO systems.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A wireless access point (AP), comprising:
   multiple transmit antennas; and
   circuitry, which is configured to:
      transmit multiple sounding frames to a receiver that comprises one or more receive antennas, wherein the sounding frames are transmitted via respective different partial subgroups of the transmit antennas;
      receive from the receiver feedback information that specifies for the sounding frames respective partial channels, each partial channel defined between the transmit antennas in a respective partial subgroup and the receive antennas, and
      calculate in the AP, based on the multiple partial channels, which correspond to the multiple different partial subgroups of transmit antennas and which were specified by the receiver in response to the multiple sounding frames, multiple respective null subspace matrices, combine the multiple null subspace matrices to produce a full null space matrix, and calculate, based on the full null space matrix, a steering matrix that is combined for all the transmit antennas; and
      transmit to at least the receiver via at least some of the transmit antennas using the steering matrix.

2. The AP according to claim 1, wherein the circuitry is configured to modulate transmissions to the receiver using an orthogonal frequency-division multiplexing (OFDM) scheme having multiple sub-carrier frequencies, and to determine a respective steering matrix for each OFDM sub-carrier frequency.

3. The AP according to claim 1, wherein the circuitry is configured to receive, in response to the sounding frames, second feedback information from another receiver, and to determine the steering matrix based on both the feedback information and the second feedback information.

4. The AP according to claim 1, wherein the circuitry is configured to transmit first and second sounding frames via respective first and second partial subgroups of the transmit antennas that have a shared transmit antenna, to receive respective first and second partial channels corresponding to the respective subgroups of the transmit antennas, and to align a phase of the second partial channel based on the phase measured in an element of the first partial channel corresponding to the shared transmit antenna.

5. The AP according to claim 1, wherein the circuitry is configured to transmit a given sounding frame using a temporary steering matrix that depends on the feedback information received in response to transmitting one or more previous sounding frames.

6. The AP according to claim 5, wherein the circuitry is configured to determine the temporary steering matrix based on one or more strongest sub-channels of the partial channels reported in response to the previous sounding frames.

7. The AP according to claim 5, wherein the circuitry is configured to transmit the given sounding frame using a beam-formed transmission in which at least two transmit antennas are assigned different steering weights.

8. The AP according to claim 1, wherein the circuitry is configured to determine the steering matrix by producing a basis that spans a full space that is complementary to a full null space represented by the full null space matrix.

9. A method, comprising:
in a wireless access point (AP) that comprises multiple transmit antennas, transmitting multiple sounding frames to a receiver that comprises one or more receive antennas, wherein the sounding frames are transmitted via respective different partial subgroups of the transmit antennas;
receiving from the receiver feedback information that specifies for the sounding frames respective partial channels, each partial channel defined between the transmit antennas in a respective partial subgroup and the receive antennas, and
calculating in the AP, based on the multiple partial channels, which correspond to the multiple different partial subgroups of transmit antennas and which were specified by the receiver in response to the multiple sounding frames, multiple respective null subspace matrices, combining the multiple null subspace matrices to produce a full null space matrix, and calculating, based on the full null space matrix, a combined steering matrix for all the transmit antennas; and
transmitting to at least the receiver via at least some of the transmit antennas using the steering matrix.

10. The method according to claim 9, wherein transmitting to the receiver comprises modulating transmissions to the receiver using an orthogonal frequency-division multiplexing (OFDM) scheme having multiple sub-carrier frequencies, and wherein determining the steering matrix comprises determining a respective steering matrix for each OFDM sub-carrier frequency.

11. The method according to claim 9, and comprising receiving, in response to the sounding frames, second feedback information from another receiver, and wherein determining the steering matrix comprises determining the steering matrix based on both the feedback information and the second feedback information.

12. The method according to claim 9, wherein transmitting the sounding frames comprises transmitting first and second sounding frames via respective first and second partial subgroups of the transmit antennas that have a shared transmit antenna, wherein receiving the feedback information comprises receiving respective first and second partial channels corresponding to the respective subgroups of the transmit antennas, and wherein determining the steering matrix comprises align a phase of the second partial channel based on the phase measured in an element of the first partial channel corresponding to the shared transmit antenna.

13. The method according to claim 9, wherein transmitting the sounding frames comprises transmitting a given sounding frame using a temporary steering matrix that depends on the feedback information received in response to transmitting one or more previous sounding frames.

14. The method according to claim 13, wherein determining the steering matrix comprises determining the temporary steering matrix based on one or more strongest sub-channels of the partial channels reported in response to the previous sounding frames.

15. The method according to claim 13, wherein transmitting the sounding frames comprises transmitting the given sounding frame using a beam-formed transmission in which at least two transmit antennas are assigned different steering weights.

16. The method according to claim 9, wherein the determining the steering matrix comprises producing a basis that spans a full space that is complementary to a full null space represented by the full null space matrix.

* * * * *